Patented Mar. 9, 1926.

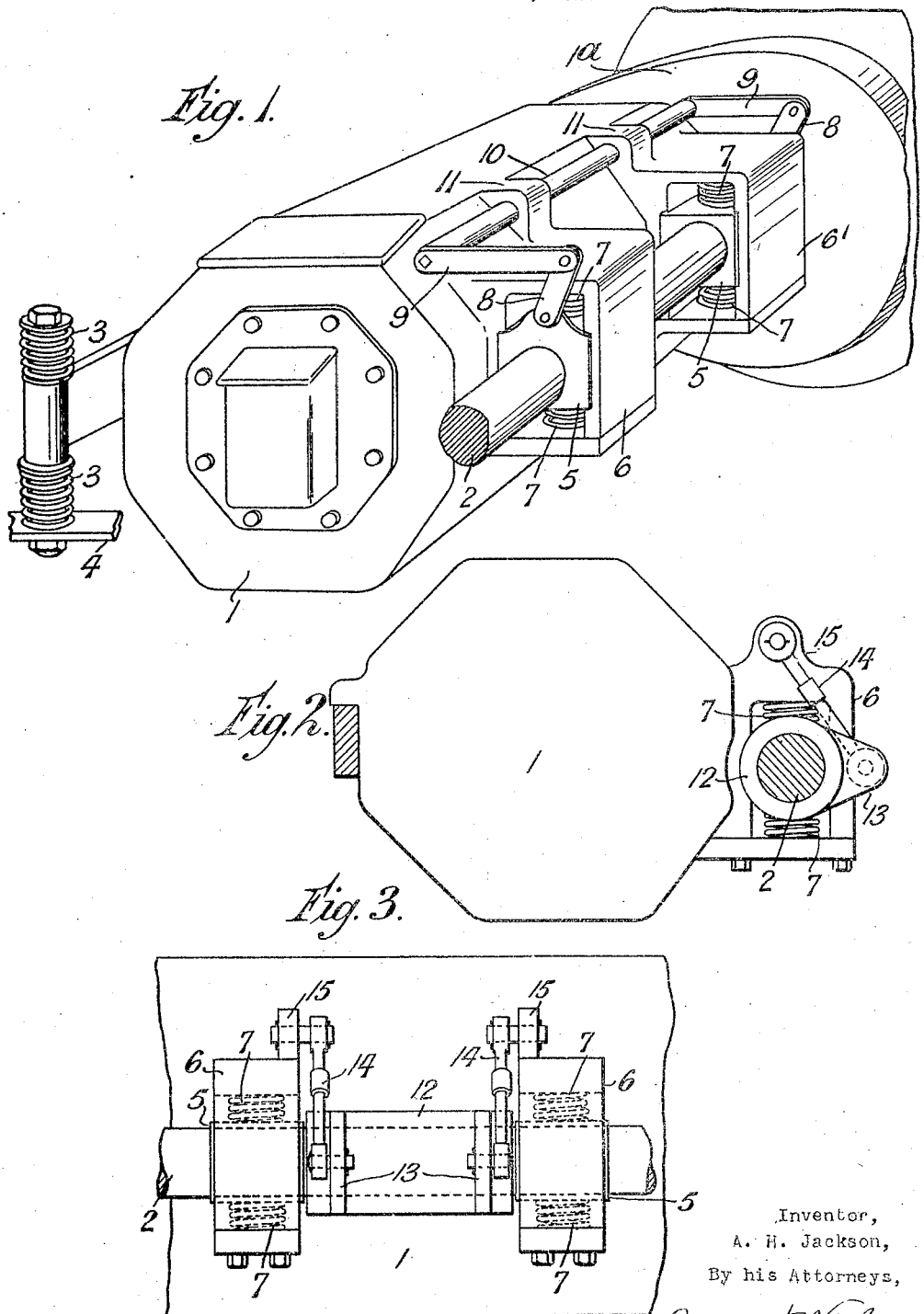

1,575,766

UNITED STATES PATENT OFFICE.

ALBERT HENRY JACKSON, OF LONDON, ENGLAND.

ELECTRICALLY-PROPELLED VEHICLE.

Application filed June 15, 1925. Serial No. 37,190.

*To all whom it may concern:*

Be it known that I, ALBERT HENRY JACKSON, a subject of the King of Great Britain, residing at "Lamorna", 124 Muswell Hill Road, London, England, have invented new and useful Improvements in Electrically-Propelled Vehicles, of which the following is a specification.

This invention relates to improvements in electric locomotives, tramcars or other electrically propelled vehicles of the type in which the motor is supported in a wholly resilient manner, and in which means are also provided for maintaining the axes of the motor shaft and driven truck axle parallel with one another.

In one form of construction, that side of the motor adjacent to the driving axle is provided with guides in which horn blocks on the driving axle are slidably mounted, springs being located above and below the horn blocks. In order to maintain the axes of the motor shaft and the truck axle, which is driven by the motor, parallel with one another, I connect the blocks by means of links to levers fast on a cross shaft (which acts as a torsion member) on the motor.

In another form of construction, I connect the motor by links to a sleeve on the truck axle, the sleeve acting in a similar manner as a torsion member.

In the accompanying drawing which shows how my invention is carried into effect, Figure 1 is a perspective view, Figure 2 an end elevation of a modification, and Figure 3 a side elevation of Figure 2.

Referring more particularly to Figure 1, 1 is an electric motor resiliently supported at the side remote from the truck axle 2 by springs 3, carried by a cross member 4 of the truck frame (not shown). The axle 2 is geared to the shaft of the motor 1 by the usual gearing (which has been omitted for the sake of clearness) enclosed in the usual gear case 1ª.

Mounted on the axle 2 are horn blocks 5, working in horn guides 6, integral with the motor 1. Interposed between the horn blocks 5 and the guides 6 are springs 7. Links 8 are pivoted at one end to the horn blocks 6 and at the other end to levers 9, fast on a shaft 10, rotatable in bearings 11 formed on the motor 1.

In the modification shown in Figures 2 and 3, similar parts have similar numerals; 12 is a sleeve rotatably mounted on the axle 2 and provided at each end with lugs 13, to which are pivoted links 14. The links 14 are pivoted at their other ends to lugs 15, carried by the guide blocks 6.

In operation, if the motor 1 and truck axle 2 move in a vertical direction, relatively to one another, owing to road shock or other cause, the axes of the motor shaft and truck axle, and therefore of the usual gearing connecting them, are maintained parallel with one another.

What I claim is:—

1. In an electric locomotive, tram car or other electrically propelled vehicle of the type referred to, the combination of an electrically driven motor, an axle driven thereby, a torsion member, and links connecting the motor to the axle through the torsion member in such manner that the axes of the motor and the axle are maintained parallel with one another.

2. In an electric locomotive, tramcar or other electrically propelled vehicle of the type referred to, the combination of guides on the motor, horn blocks mounted therein, and links connecting the horn blocks to levers carried by a torsion member on the motor, as and for the purpose set forth.

In testimony that I claim the foregoing as my invention I have signed my name this 3rd day of June, 1925.

ALBERT HENRY JACKSON.